United States Patent
Poulain et al.

(10) Patent No.: US 7,216,977 B2
(45) Date of Patent: May 15, 2007

(54) OPHTHALMIC LENS WITH PROGRESSIVE ADDITION OF POWER AND PRISM

(75) Inventors: Isabelle Poulain, Saint-Maur des Fosses (FR); Björn Drobe, Paris (FR); Clotilde Haro, Creteil (FR); Pascal Allione, Courbevoie (FR); Francoise Ahsbahs, Saint-Maur des Fosses (FR)

(73) Assignee: Essilor International (Compagnie Generale d' Optique), Charenton le Pont (FR)

( * ) Notice: Subject to any disclaimer, the term of this patent is extended or adjusted under 35 U.S.C. 154(b) by 105 days.

(21) Appl. No.: 10/543,539

(22) PCT Filed: Jan. 30, 2004

(86) PCT No.: PCT/FR2004/000210

§ 371 (c)(1),
(2), (4) Date: Jul. 27, 2005

(87) PCT Pub. No.: WO2004/070426

PCT Pub. Date: Aug. 19, 2004

(65) Prior Publication Data

US 2006/0139571 A1    Jun. 29, 2006

(30) Foreign Application Priority Data

Feb. 3, 2003   (FR) .................................. 03 01185

(51) Int. Cl.
*G02C 7/06* (2006.01)

(52) U.S. Cl. ..................................... 351/169; 351/177
(58) Field of Classification Search ................ 351/169, 351/177
See application file for complete search history.

(56) References Cited

U.S. PATENT DOCUMENTS

| | | | |
|---|---|---|---|
| 2,118,132 A | 5/1938 | Ames, Jr. et al. | |
| 2,442,849 A | 6/1948 | Glazer | |
| 5,270,745 A | 12/1993 | Pedrono | |
| 5,708,492 A * | 1/1998 | Kitani | ........................ 351/169 |
| 6,364,481 B1 | 4/2002 | O'Connor et al. | |
| 6,505,934 B1 | 1/2003 | Menezes | |
| 6,685,316 B2 * | 2/2004 | Baumbach et al. | ......... 351/169 |
| 6,808,263 B2 * | 10/2004 | Welk et al. | ................. 351/169 |

\* cited by examiner

*Primary Examiner*—Scott J. Sugarman
(74) *Attorney, Agent, or Firm*—Young & Thompson

(57) ABSTRACT

The lens presents horizontal prismatic refractive power that varies progressively along the main progression meridian (MM') with the addition of horizontal prismatic power being greater than 2 prismatic diopters in absolute value, this addition of horizontal prismatic power being defined by the difference between the horizontal prismatic refractive power at the reference point (L) of the far vision zone and the horizontal prismatic refractive power at the projection point (P') of the reference point (P) of the near vision zone (VP) on the vertical line passing through the reference point (L) of the far vision zone.

17 Claims, 3 Drawing Sheets

OPHTHALMIC LENS WITH PROGRESSIVE ADDITION OF POWER AND PRISM

The present invention relates in general to the field of visual equipment seeking to correct or prevent troubles with refract ion of the eye. More precisely, it relates to a multifocal ophthalmic lens with progressive addition of power and prism, of the spectacles' lens type (i.e. designed to exert its correcting power at a distance from the eye). The invention also relates to applying such a lens to the visual equipment either of subjects who are presbyopic, or of subjects who are myopic or emmetropic (in particular children).

BACKGROUND OF THE INVENTION

For subjects with presbyopia, the lens of the invention seeks to compensate for any heterophoria that exists in addition to the presbyopia. Heterophoria, i.e. departure of the two visual axes from the point of fixation under consideration, remains latent in the absence of any appropriate fusion stimulus.

Consequently, for this particular fixation distance, the active and passive positions do not coincide. Depending on the relative direction of the deflection, various forms of heterophoria are described: esophoria (inward deflection of the visual axes of the eyes), and exophoria (outward deflection of the visual axes of the eyes). (Source: "Le Nouveau Dictionnaire de la Vision" [The new dictionary of vision] by Michel Millodot, published by Mediacom Vision 1997, Bures sur Yvette, p. 72.). Most individuals present heterophoria to a greater or lesser extent. To compensate for this divergence or convergence of fixation lines, the subject needs to converge or diverge to a greater extent. Depending on the subject, the subject's state of fatigue, or the subject's age, this additional converging effort can lead to visual discomfort, particularly for near vision. If compensation is insufficient or too laborious, heterophoria can even turn out to be an obstacle to wearing progressive lenses.

For subjects who are myopic or emmetropic, the purpose is to control progress of myopia, and in particular to prevent or slow down the progress of myopia in children. The modern world is pushing an increasing that involves intensive use of vision that is near, intermediate, and central. Working with near vision thus occupies a major place in the daily activities of the visual system of a child or an adult. It would appear that working with near vision plays a role in the development of myopia. Recent studies confirm the importance of this environmental factor, particularly with children. The level of school attendance seems to have an influence on the percentage of people with myopia in a given population, and the degree of myopia appears to be correlated with the number of hours spent each day using near vision. In western countries, the proportion of people with myopia lies in the range 15% to 20% This proportion rises to 50% or even 70% in Asian countries such as China and Japan. In African countries, the proportion of people with myopia (other than those with congenital myopia) is down to practically zero.

It has thus been put forward that acquired myopia (in contrast to congenital myopia that is present at birth) is associated with prolonged work with near vision, and that the level of myopia depends on the length of time spent working with near vision. Myopia would thus be an adaptation of the visual system to working with near vision. Optometrists have thus proposed solutions attempting to slow down the progress of acquired myopia. A first solution consists in prescribing glasses that correct a wearer's myopia by an amount that is less than that person's myopia in far vision, the idea being to reduce the accommodation effort needed to go from far vision to near vision. That method is open to dispute and has not been proved to be effective. Another solution consists in prescribing correction that is too great for a person's far vision. The ametropia of young sufferers of hypermetropia is more stable over time than is the ametropia of young sufferers of myopia, and the idea is to make young sufferers of myopia hypermetropic by prescribing them with too much correction. The effectiveness of that method has not been demonstrated either. Other specialists have proposed visual training: repeated visual experiments of relaxation and exercises for relieving tension in the eyes. The effect of those methods on the ametropic of the subject have not been proved.

Finally, optometrists have attempted to slow down progress of myopia by prescribing the subject with a spherical addition of power in near vision. Such an addition would have the effect of reducing the effort of accommodation in near vision. In order to verify that hypothesis, studies have been carried out on prescribing bifocal lenses or lenses with progressive addition of power to children with myopia. Those studies are generally incomplete and have given mixed results on the progress of myopia: effectiveness is found to vary depending on the wearer under test, such that it has not been possible to put forward any valid solution for systematic and effective treatment of all or at least the majority of the childhood population with myopia.

OBJECTS AND SUMMARY OF THE INVENTION

There thus exists a need for another solution for effectively correcting and/or slowing down the progress of myopia.

Independently of these two problems of presbyopia and ametropia, what is the state of the art in multifocal corrective ophthalmic lenses with progressive addition of power?

This type of lens habitually possesses a far vision zone, a near vision zone, and an intermediate vision zone situated between the first two zones, these three zones being crossed by a main progression meridian along which the spherical refractive power of the lens varies progressively, said lens having optical correction power defined in particular by:

an addition of spherical power equal to the variation in the spherical refractive power between a reference point of the far vision zone and a reference point of the near vision zone, these two points being situated on the main progression meridian;

nominal spherical power equal to the spherical refractive power at said reference point of the far vision zone; and nominal astigmatism corresponding to the prescribed correction for astigmatism, equal to the cylindrical refractive power at said reference point of the far vision zone.

On standard multifocal lenses, for small nominal astigmatism (less than 1 diopter), there exists a mathematical relationship between the spherical refractive power and the horizontal prismatic refractive power at the reference point for near vision. Optically, the prismatic refractive power increases with spherical refractive power, but this progression in prismatic power that stems from progression in spherical power has not been mastered in the past, nor has it even been taken into account when designing progressive lenses. Unfortunately, this natural and involuntary progression in prismatic power does not always comply with the physiological needs of the wearer for near vision, particularly concerning the wearer's degree of heterophoria, and in any event remains insufficient for numerous wearers with presbyopia and also for most wearers with myopia, in particular children, because of the interactions between accommodation and convergence.

The multifocal lens of the invention remedies the various problems described above by integrating addition that is progressive and sensitive to horizontal prismatic refractive power in addition to the refractive power that results from the progressive spherical power. In other words, the invention seeks to determine the value for horizontal prismatic power and the value for spherical power in near vision independently of each other and in such a manner as to reinforce the prism in near vision while preserving continuity of prismatic power. For this purpose, the invention proposes introducing a minimum addition of prismatic power on the vertical passing through the reference point for far vision.

The invention thus provides, firstly, an ophthalmic lens with progressive addition of spherical power, the lens possessing a far vision zone, a near vision zone, and an intermediate vision zone situated between the two preceding zones, these three zones being crossed by a main progression meridian along which the spherical refractive power of the lens varies progressively, said lens having optical corrective power defined in particular by:

spherical power addition equal to the variation in spherical refractive power between a reference point of the far vision zone and a reference point of the near vision zone, these two points being situated on the main progression meridian;

nominal spherical power equal to the spherical refractive power at said reference point of the far vision zone; and nominal astigmatism equal to the cylindrical refractive power at said reference point of the far vision zone of less than 1 diopter, which lens presents horizontal prismatic refractive power that varies progressively along the main progression meridian with an addition of horizontal prismatic power greater than 2 prismatic diopters in absolute value, said addition of horizontal prismatic power being defined as the difference between the horizontal prismatic refractive power at the reference point of the far vision zone and the horizontal prismatic refractive power at the projection point of the reference point of the near vision zone onto the vertical line passing through the reference point of the far vision zone.

It is nevertheless preferable for the addition of horizontal prismatic power to remain less than an absolute value of 5 prismatic diopters.

In more restrictive and advantageous manner, the addition of horizontal prismatic power lies in the range 2.5 to 3.5 in absolute value.

It is generally considered that the horizontal prismatic power at the reference point of the far vision zone should be less than 1 prismatic diopter and preferably less than 0.5 prismatic diopters in absolute value. It is important to conserve the absence or quasi-absence of horizontal prism in far vision in order to avoid the subject becoming permanently adapted to the prism. That is why, in the invention, prismatic power is not reinforced uniformly, but follows a perceptible progression of prism from the far vision zone where the horizontal prism remains small or even zero or nearly zero (assuming that there is no prescribed prismatic correction), to the near vision zone where it reaches a predetermined value, possibly as a function of physiological parameters of the subject.

For effective co-operation with horizontal prism values and/or addition of horizontal prism as defined above, it is preferable to provide for the nominal power to lie in the range +0.75 diopters to −10 diopters.

For application to subjects with myopia or emmetropia, the invention also provides the use of a lens presenting one or more of the above-defined optical characteristics in the fabrication of visual equipment for people with myopia or emmetropia, and still more particularly for children with myopia.

The invention also provides a method of correcting and/or preventing ametropia, in particular of myopia, comprising wearing visual equipment comprising at least one corrective ophthalmic lens with progressive addition of power possessing a far vision zone, a near vision zone, and an intermediate vision zone situated between the two preceding zones, these three zones being crossed by a main progression meridian along which the spherical power and also the horizontal prismatic power both vary progressively.

Advantageously, the lens used in this method reproduces one or more of the above-defined optical characteristics.

The method is advantageously applied to children with myopia.

When a subject with myopia who is to be fitted with glasses presents exophoria in near vision, the addition of prism to the lens is nasally based. Conversely, when the subject with myopia to be fitted with glasses presents esophoria in near vision, then the prism addition of the lens is temporally based.

The results of studies undertaken by the Applicant on correcting and slowing down progress in myopia show that prescribing only an addition of power is not effective for all subjects with myopia. More precisely, it turns out that when working in near vision, both the accommodation and the convergent systems are made to work hard. Thus, the principle of the invention is to propose balancing simultaneously and in combination both accommodation demand and convergence demand in near vision in order to prevent possible appearance of myopia or at least to slow down its rate of progress, or even to stabilize it. Achieving equilibrium between accommodation and convergence is an important point that has been neglected in studies prescribing only addition in near vision. Nevertheless, compared with convergence, accommodation is to a lesser extent responsible for the increase in intraocular pressure that can lead to myopia gaining a hold when working with near vision. Failure to take account of balance between accommodation and convergence is a point that can explain the ineffectiveness of mere addition in near vision for certain subjects with myopia. For example, a subject with exophoric myopia in a state of under-convergence in near vision and wearing glasses with addition only will indeed make less use of accommodation, but as a result will need to provide a greater effort in fusional convergence. It therefore appears to be important to act both on convergence and on accommodation by attempting to avoid disturbing the balance that exists between those two systems.

In its application to presbyopia, the present invention proposes reducing the heterophoric discomfort mentioned above and increasing the acceptability of progressive lenses for subjects having presbyopia by adding significant progression in horizontal prismatic power. To this end, the invention provides more precisely for the use of a lens presenting one or more of the above-defined optical characteristics in the fabrication of visual equipment for a subject having presbyopia, together with a method of correcting and/or visually training a subject with presbyopia, comprising wearing visual equipment including at least one ophthalmic lens presenting one or more of the above-defined optical characteristics.

For "palliative" correction of a subject with presbyopia presenting exophoria or esophoria in near vision, the prism addition provided by the lens is respectively nasally based or temporally based.

In contrast, for "curative" visual training of a subject with presbyopia presenting exophoria or esophoria in near vision, the prism added by the lens is temporally or nasally based, respectively.

BRIEF DESCRIPTION OF THE DRAWINGS

Other characteristics and advantages of the invention appear on reading the following description of a particular embodiment given by way of non-limiting example.

Reference is made to the accompanying drawings, in which.

MORE DETAILED DESCRIPTION

Figure 1:
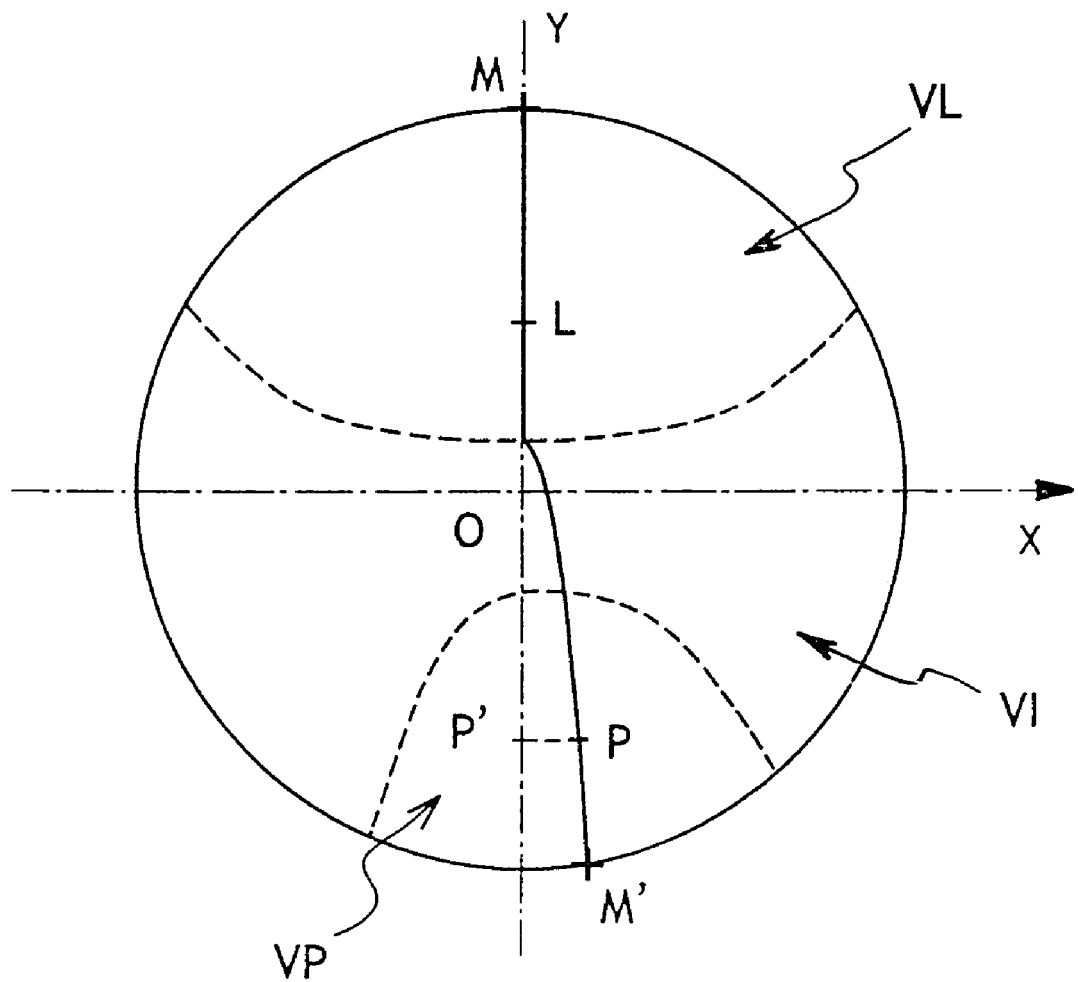
FIG. 1 is a front view of an ophthalmic lens with progressive addition of power, showing diagrammatically the various zones and points of interest in such a lens.

In the context of the present description, the following definitions are used.

The optical correction power of a correcting ophthalmic lens is defined by its spherical, cylindrical, and prismatic refractive power properties. It will be understood that such an optical definition gives a scope that is more general than a definition that is purely in terms of area: it defines the overall effect of the refractive power of the lens on an incident light ray, that results from the algebraic sum of the refractive powers acting in succession on the front and rear faces of the lens. It will be understood that such an optical definition covers a plurality, and even an infinity, of combinations of pairs of surfaces producing the same overall optical refractive effect, as set out in the document "Theoretical aspects of concentric varifocal lenses" by W. N. Charman, in Ophthal. Physiol. Opt. Vol. 2, No. 1, pp. 75–86, 1982, published by Pergamon Press for the British College of Ophthalmic Opticians.

In the context of the present invention the numerical values of the optical magnitudes used in the definitions (spherical, cylindrical, and prismatic powers) are obtained by the frontocometric optical measurement method that is well known to opticians, and that is described concisely in the document "Paraxial optics" by W. F. Long, in Visual Optics and Instrumentation, editor N. Charman, Macmillan Press, London 1991, pp. 418–419, incorporated in the present application by reference.

The "spherical refractive power" of a lens for an incident ray passing through the lens, also known as the total power or the refractive power or the focusing power or the spherical power is the magnitude which characterizes and quantifies the prime effect of spherical refractive power (the "magnifying glass" effect) of the lens on the ray in question: if it is positive, the lens has a converging effect on the ray; if it is negative, it has a diverging effect on the ray.

The "cylindrical refractive power" of a lens for an incident ray passing through the lens is the magnitude that characterizes and quantifies the cylindrical refractive effect exerted by the lens on the ray in question, whereby not only one but two focal areas are formed situated in different planes, generally mutually perpendicular planes, referred to as the tangential focal plane and the sagittal focal plane. This cylindrical power also known as "astigmatic power" or merely "astigmatism" corresponds to the difference between the spherical powers for the two focal areas.

The "prismatic refractive power" of a lens for an incident ray passing through the lens is the magnitude which characterizes and quantifies the prismatic refractive effect or more simply the deflection exerted by the lens on the ray in question. This prismatic power, also known as "prism" corresponds to the deflection angle of the ray, i.e. the angle formed between the incoming and outgoing portions of the ray The prism comprises two components: a horizontal component referred to as "horizontal prism" corresponding to the angle formed between the projections of the incoming and outgoing portions of the ray onto a horizontal plane, and the other component being vertical, known as "vertical prism", corresponding to the angle formed between the projections of the incoming and outgoing portions of the ray onto a vertical plane. In this definition, it is assumed that the lens is placed in its conventional in-use configuration: its optical axis is horizontal and its mounting circles define a horizontal straight line. The unit for measuring prism is the prismatic diopter which corresponds to a beam being deflected by 1 centimeter (cm) at a distance of 1 meter (m) (i.e. approximately 0.57°).

A corrective ophthalmic lens with progressive power addition is defined in particular by two main optical magnitudes:

"spherical power addition". $\Delta Pu$ equal to the variation in spherical power between a reference point L of the far vision zone and a reference point P of the near vision zone VP, these two points P and L being situated on the main progression meridian MM';

a "nominal power" Pn equal to the power at said reference point L of the far vision zone VL; and nominal astigmatism An equal to the cylindrical refractive power at said reference point L of the far vision zone VL.

In the context of the present invention, in order to determine numerical values for prism, attention is given to the most usual circumstances in which nominal astigmatism An is small, i.e. less than 1 diopter. It is known that prism depends to a non-negligible extent on astigmatism, such that with increasing astigmatism, prism also increases. Thus, for a lens having nominal astigmatism greater than 1 diopter, it is necessary to envisage prism values greater than 2 prismatic diopters.

With reference to FIG. 1, a corrective ophthalmic lens with progressive addition of spherical power conventionally comprises a far vision zone VL situated in its upper portion, a near vision zone VP situated in its lower portion, and an intermediate vision zone VI situated between those two zones.

There can also be seen a main progression meridian MM' drawn as a bold line passing through these three zones VL, VI, and VP in a direction that is generally vertical, with a far vision reference point L and a near vision reference point P.

In the description below, an orthogonal coordinate system is used as shown in FIG. 1. In this figure, there can be seen a plan view of a finished lens of circular shape prior to trimming, typically having a diameter of 60 millimeters (mm). A point on the lens is used by the prescription laboratory for the prism reference: in general this point is the geometrical center of the lens, as in the case shown, where it is referenced O in the figure. The prism reference point is usually marked on the lens by means of a visible dot. The prism reference point is used by the prescription laboratory for adapting the lens to the prism prescribed for the subject by the ophthalmologist.

In the frame of reference defined in FIG. 1, the abscissa axis X corresponds to the horizontal axis of the lens, and the ordinate axis Y corresponds to the vertical axis. The point O in FIG. 1 is at the geometrical center of the lens. In this definition, vertical and horizontal correspond to the orientation of the lens while it is in use. Thus, in progressive lenses of the Applicant, the vertical ordinate axis Y is defined by the center O of the lens (which is also the prism reference point) and by the mounting cross, both of which are marked on the lens in practice.

As with all lenses sold by the Applicant, the reference point L for far vision is situated 8 mm above the center O of the lens, while the reference point P for near vision is situated 14 mm below the center O The main progression meridian MM' is drawn here as a bold line, of shape that can advantageously vary as a function of the power addition ΔPu and of the nominal spherical power at the reference point for far vision L, as described by the Applicant in U.S. Pat. No. 5,270,745.

An essential aspect of the present invention relates to progression of prism along the main meridian, or more precisely, as explained below, along the vertical axis Y. Horizontal prism is added along the vertical axis Y.

FIGS. 2 to 5 relate firstly to a prior art lens and then to a lens of the invention, and they show the values of horizontal prism along the main progression meridian and along the vertical axis Y. In all of these figures, the abscissa shows the ordinate value Y of the point under consideration of the lens, expressed in millimeters, and the ordinate shows the horizontal prismatic power Prh, expressed in prismatic diopters (D).

Figure 2:
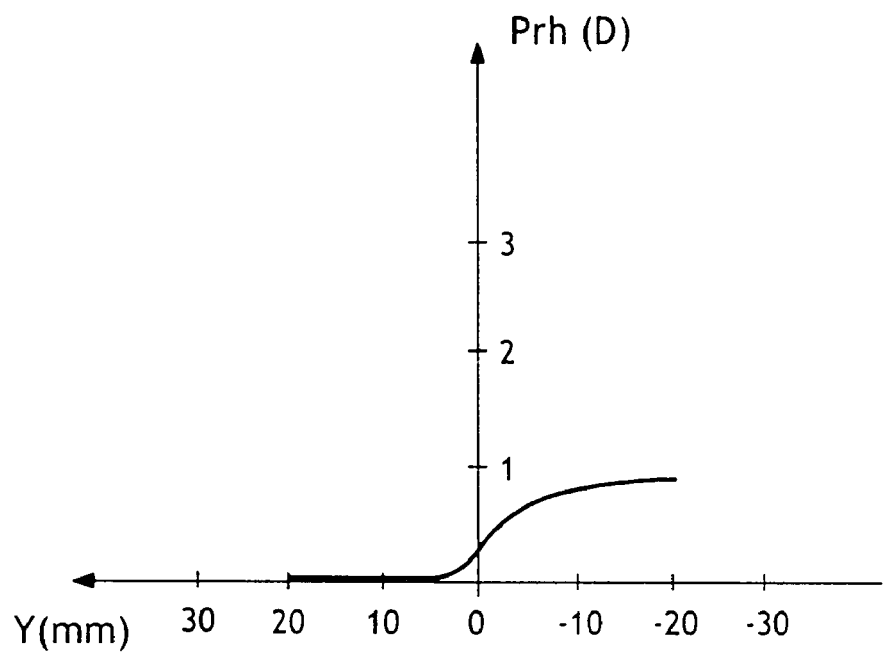
FIG. 2 is a graph for an ophthalmic lens with progressive addition of power as in the prior art, showing the horizontal prism values along the main progression meridian.

With reference to FIG. 2, we begin by observing the state of the art in this context. The graph of FIG. 2 shows how values of horizontal prismatic power vary along the main progression meridian of a corrective ophthalmic lens with known progressive addition of power. The lens taken as an example forms part of the family of lenses sold by the Applicant under the trademark Varilus Comfort Orma and it possesses nominal spherical power of −4 diopters and spherical power addition of 2 diopters. Nominal astigmatism is zero. The reference point L of the far vision zone VL is situated at an ordinate position Y=+8 mm; the reference point P of the near vision zone VP and its projection P' onto the axis Y are situated at an ordinate position Y=−14 mm. That lens is dedicated solely to correcting presbyopia and takes no account of any problem of heterophoria, and is in no way proposed for correcting or treating myopia.

With that example, it can indeed be seen that horizontal prism Prh varies along the main progression meridian MM'. However this variation is only small: about 0.8 prismatic diopters between the reference point L of the far vision zone where it is zero, and the reference point P of the near vision zone VP where it has a value of about 0.8 prismatic diopters. This variation in prism does not properly speaking constitute a genuine addition of prism. It is in fact due to the prismatic effects induced by the power of the lens increasing up to point P, it is too small to produce any effect whatsoever on the convergence in near vision of the user, and, as a result, it cannot produce any combined effect on the user's myopia or heterophoria.

Figure 3:
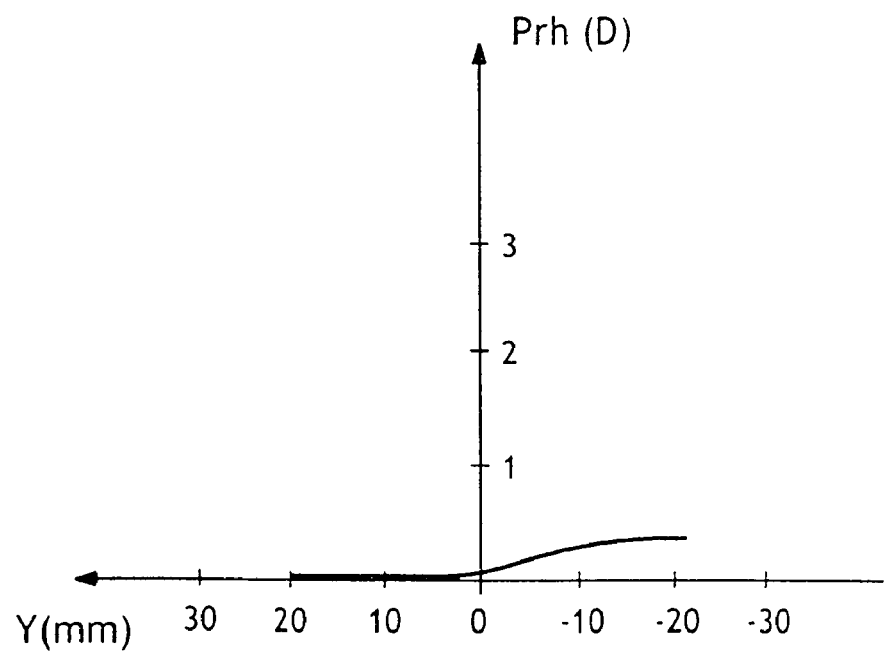
FIG. 3 is a graph for the ophthalmic lens of FIG. 2 showing the horizontal prism values along the vertical passing through the reference point for far vision.

Above all, if variation in horizontal prism is observed along the vertical Y as shown in FIG. 3, it can be seen that this remains practically zero. It varies very little: from about 0.2 prismatic diopters between the reference point L of the far vision zone, where it is zero, and the projection point P' of the reference point P of the near vision zone VP where it has a value of about 0.2 prismatic diopters. There is thus no perceptible addition of prism along the vertical Y, given that tolerances in practice (on the prism prescribed for point L, when prismatic correction is to be provided) is usually 0.25 prismatic diopters.

Figure 4:
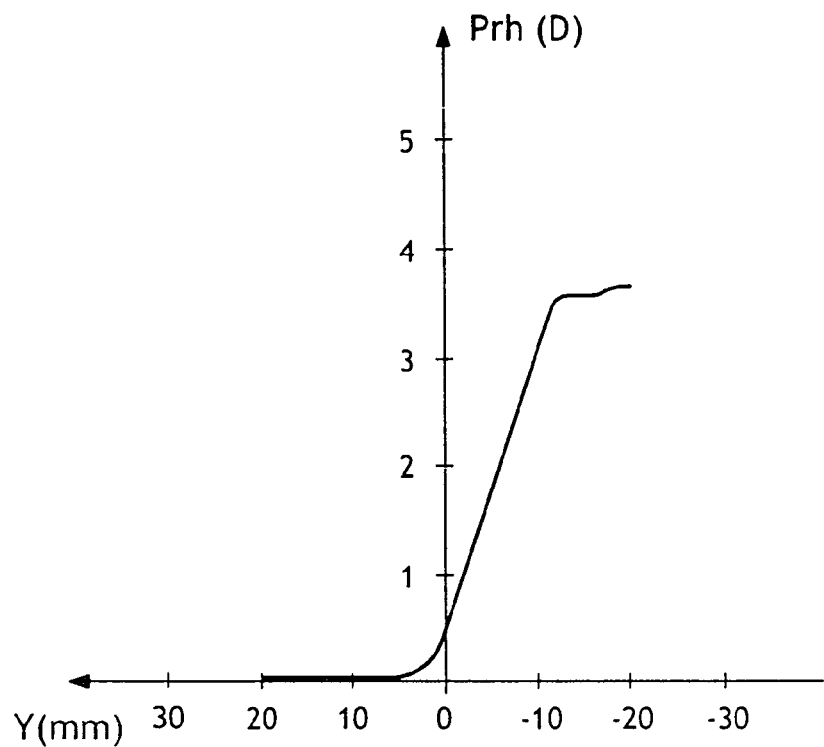
FIG. 4 is a graph analogous to that of FIG. 2 for an ophthalmic lens with progressive addition of power in accordance with the invention, showing horizontal prism values along the main progressive meridian.

This variation in prism is compared with that shown in FIG. 4. The graph of FIG. 4 is analogous to that of FIG. 2, but it shows variation in spherical power and horizontal prism values along the main progression meridian of a corrective ophthalmic lens with progressive addition of power in accordance with the invention. The lens shown here possesses the same nominal spherical power of −4 diopters and the same spherical power addition of 2 diopters as the prior art lens considered above with reference to FIGS. 2 and 3. Nominal astigmatism is zero. Similarly, the reference point L of the far vision zone VL is situated at ordinate value Y=+8 mm; the reference point P of the near vision zone VP and its projection P' on the axis Y are situated at an ordinate value Y=−14 mm.

It can be seen here that the horizontal prism Prh varies much more strongly. Between the reference point L of the far vision zone VL where it is zero and to the reference point P of the near vision zone VP where it is Prh(P)=3.5 prismatic diopters, the prism varies by 3.5 prismatic diopters. This value is therefore 4.4 times greater than the value observed for the prior art lens of FIG. 2. Not only is the variation in prism pronounced, it is also progressive, i.e. continuous at least to the first degree. Indeed, for optical smoothness of the lens on the user, it is preferable for the variation function of horizontal prism along the meridian to be continuous to the second order.

Figure 5:
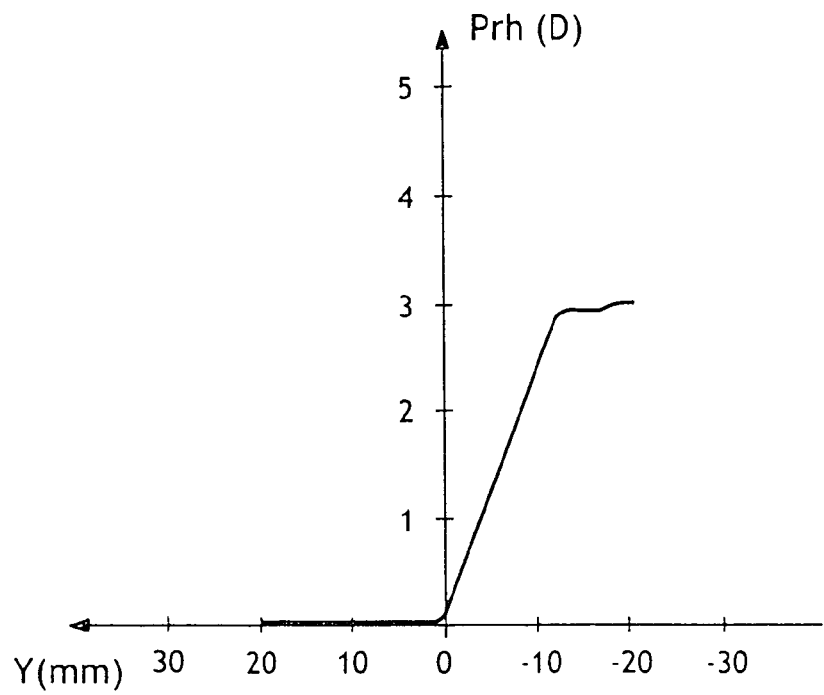
FIG. 5 is a graph, for the ophthalmic lens of FIG. 4, showing the horizontal prism values along the vertical passing through the reference point for far vision.

This progression in horizontal prism along the meridian results from progressive addition of horizontal prism introduced on the vertical passing through the point L, i.e. on the ordinate axis Y. In FIG. 5, there can be seen this variation in horizontal prism along the vertical axis Y. This is indeed a deliberate addition of horizontal prism, since along this vertical axis Y, horizontal prismatic effects are negligible.

This defines an addition of horizontal prismatic power, or more simply an addition of horizontal prism, written ΔPrh, as being the difference between the horizontal prismatic refractive power Prh(L) at the reference point L of the far vision zone and the horizontal prismatic refractive power Prh(P') at the projection point P' of the reference point P of the near vision zone VP on the vertical axis Y passing through the reference point L of the far vision zone. This gives the formula:

$$\Delta Prh = Prh(L) - Prh(P')$$

In the example described:
Prh(L)=0 prismatic diopters
Prh(P')=3 prismatic diopters so ΔPrh=3 prismatic diopters.

More generally, calculations and tests in use have made it possible to define as a function of the spherical power addition ΔPu, upper and lower limits $\Delta Prh_{hi}$ and $\Delta Prh_{lo}$ in absolute value for horizontal prism addition. These limits are defined by the following formulae:

$$\Delta Prh_{lo1} < |\Delta Prh| < \Delta Prh_{hi1}$$

with $\Delta Prh_{hi1}$=5 prismatic diopters and $\Delta Prh_{lo1}$=2 prismatic diopters.

A graphical representation of these functions is given by the graph of FIG. 4.

More restrictive and advantageous limits for horizontal prism addition have also been defined by means of the following formula:

$$\Delta Prh_{lo2} < |\Delta Prh| < \Delta Prh_{hi2}$$

with $\Delta Prh_{hi2}$=3.55 prismatic diopters and $\Delta Prh_{lo2}$=2.5 prismatic diopters.

Normally, apart from the special case of prescribed prismatic correction (e.g. for squinting), the wearer does not need any prism correction over the lens as a whole, such that the horizontal prism Prh(L) at the reference point L of the far vision zone VL must remain small or zero. It is important to conserve no or practically no horizontal prism in far vision in order to avoid the subject becoming permanently adapted to the prism. That is why, in the invention, prismatic power is not increased uniformly, but follows a perceptible progression of prism, from the far vision zone where the horizontal prism remains small to the near vision zone where it reaches a predetermined value, possibly as a function of physiological parameters of the subject. To give numerical examples, it can be assumed that it is preferable for the horizontal prism to remain less than 1 prismatic diopter, and preferably less than 0.5 prismatic diopters in absolute value. This gives the following formula:

$$|Prh(L)| < 1 \text{ prismatic diopter}$$

or advantageously $$|Prh(L)| < 0.5 \text{ prismatic diopters}$$

Furthermore, for effective co-operation with these values of horizontal prism and horizontal prism addition, it is preferable to provide for the nominal power to lie in the range +0.75 diopters to −10 diopters.

In the invention, it is recommended to use a lens satisfying the above-defined optical characteristics for fabricating visual equipment, such as spectacles, for people with myopia, and more particularly for children with myopia.

A lens as described above may be applied in different ways either to subjects with presbyopia, or to subjects with myopia or emmetropia.

For application to subjects with myopia or emmetropia, the lens presenting one or more of the above-defined optical characteristics can be used to fabricate visual equipment—typically spectacles—for subjects with myopia or emmetropia, and more particularly still for children with myopia.

More generally, for subjects with ametropia, and in particular myopia, it is possible to envisage correcting them or preventing them from appearing or becoming worse by wearing visual equipment such as spectacles having at least one ophthalmic lens analogous to that described above, i.e. presenting prism addition on the vertical axis Y, as defined above. Nevertheless, under such circumstances, it is possible to envisage adding horizontal prism values of less than 2 prismatic diopters, in particular for subjects with weak myopia, weak heterophoria, or young children; however below 0.5 diopters, it can be assumed that the prism effect will be imperceptible and will therefore have no effect.

Naturally, the lens used may advantageously present one or more of the above-defined optical characteristics.

The correction or prevention as obtained in this way is particularly suitable for application in the specific population of children with myopia.

The orientation of the added prism that results from adding horizontal prism depends on the user, and more precisely on the heterophoria of the user. When the subject with myopia presents exophoria in near vision, then the added prism is nasally based, which means that its effect is to offset the images perceived by the user outwards, i.e. to the left to the left eye and to the right to the right eye. Conversely, when the subject with myopia presents esophoria in near vision, the added prism is temporally based, which means that its effect is to offset the images perceived by the user inwards, i.e. towards the right for the left eye and towards the left for the right eye.

In its application to presbyopia, the present invention proposes reducing the discomfort of heterophoria and increasing the acceptability of progressive lenses for subjects with presbyopia by adding significant progression in horizontal prismatic power. For this purpose, it is possible to provide correction and/or visual training of the subject with presbyopia by wearing visual equipment including at least one ophthalmic lens presenting one or more of the above-defined optical characteristics.

The orientation of the added prism that results from adding horizontal prism depends on the user, and more precisely on the user's heterophoria in near vision. It also depends on the way in which it is desired to take charge of the subject's presbyopia.

This can be done for palliative purposes: in which case all that is required is to compensate for the heterophoria. If the user with presbyopia presents exophoria in near vision, then the added prism is nasally based. Conversely, if the user with presbyopia presents esophoria in near vision, then the added prism is temporally based.

Conversely, the purpose might be "curative": under such circumstances, it is desired to force the user to perform visual training in order to reduce heterophoria. If the user with presbyopia presents exophoria in near vision, then the added prism is temporally based. Conversely, if the user with presbyopia presents esophoria in near vision, then the added prism is nasally based.

What is claimed is:

1. An ophthalmic lens with progressive addition of spherical power, the lens possessing a far vision zone (VL), a near vision zone (VP), and an intermediate vision zone (VI) situated between the two preceding zones, these three zones being crossed by a main progression meridian (MM') along which the spherical refractive power (Pu) of the lens varies progressively, said lens having optical corrective power defined in particular by:

spherical power addition (ΔPu) equal to the variation in spherical refractive power between a reference point (L) of the far vision zone and a reference point (P) of the near vision zone (VP), these two points (P, L) being situated on the main progression meridian (MM');

nominal spherical power ($\Delta Pn$) equal to the spherical refractive power at said reference point (L) of the far vision zone (VL); and nominal astigmatism (An) equal to the cylindrical refractive power at said reference point (L) of the far vision zone (VL) of less than 1 diopter;

the lens presenting horizontal prismatic refractive power (Prh) that varies progressively along the main progression meridian (MM') with an addition of horizontal prismatic power ($\Delta Prh$) greater than 2 prismatic diopters in absolute value, said addition of horizontal prismatic power ($\Delta Prh$) being defined as the difference between the horizontal prismatic refractive power (Prh(L)) at the reference point (L) of the far vision zone and the horizontal prismatic refractive power (Prh(P')) at the projection point (P') of the reference point (P) of the near vision zone (VP) onto the vertical line passing through the reference point (L) of the far vision zone.

2. A lens according to claim 1, in which the addition of horizontal prismatic power ($\Delta Prh$) is less than 5 prismatic diopters in absolute value.

3. A lens according to claim 2, in which the addition of horizontal prismatic power ($\Delta Prh$) lies in the range 2.5 to 3.5 prismatic diopters in absolute value.

4. A lens according to claim 1, in which the horizontal prismatic power (Prh(L)) at the reference point (L) of the far vision zone (VL) is less than 1 prismatic diopter, and preferably less than 0.5 prismatic diopters, in absolute value, in the absence of any prescribed prismatic correction.

5. A lens according to claim 1, in which the nominal power (Pn) lies in the range +0.75 diopters to −10 diopters.

6. A lens according to claim 1, in which the function with which horizontal prism (Prh) varies along the meridian is continuous to the second order.

7. The use of a lens according to claim 1 for fabricating visual equipment for subjects with myopia or emmetropia.

8. The use of a lens according to claim 7 for fabricating visual equipment for children with myopia.

9. The use of a lens according to claim 1 for fabricating visual equipment for a subject with presbyopia.

10. A method of correcting and/or visually training a subject with presbyopia, comprising wearing visual equipment comprising at least one ophthalmic lens according to claim 1.

11. A method according to claim 10 for correcting a subject with presbyopia presenting exophoria or esophoria in near vision, in which the addition of prism by the lens is respectively nasally based or temporally based.

12. A method according to claim 10 for visually training a subject with presbyopia presenting exophoria or esophoria in near vision, in which the addition of prism by the lens is respectively temporally based or nasally based.

13. A method of correcting and/or preventing ametropia, in particular of myopia, comprising wearing visual equipment comprising at least one corrective ophthalmic lens with progressive addition of power possessing a far vision zone (VL), a near vision zone (VP), and an intermediate vision zone (VI) situated between the two preceding zones, these three zones being crossed by a main progression meridian (MM') along which the spherical power (Pu) and also the horizontal prismatic power (Prh) both vary progressively.

14. A method according to claim 13, in which said lens is an ophthalmic lens with progressive addition of spherical power, the lens possessing a far vision zone (VL), a near vision zone (VP), and an intermediate vision zone (VI) situated between the two preceding zones, these three zones being crossed by a main progression meridian (MM') along which the spherical refractive power (Pu) of the lens varies progressively, said lens having optical corrective power defined in particular by:

spherical power addition ($\Delta Pu$) equal to the variation in spherical refractive power between a reference point (L) of the far vision zone and a reference point (P) of the near vision zone (VP), these two points (P, L) being situated on the main progression meridian (MM');

nominal spherical power (Pn) equal to the spherical refractive power at said reference point (L) of the far vision zone (VL); and nominal astigmatism (An) equal to the cylindrical refractive power at said reference point (L) of the far vision zone (VL) of less than 1 diopter;

the lens presenting horizontal prismatic refractive power (Prh) that varies progressively along the main progression meridian (MM') with an addition of horizontal prismatic power ($\Delta Prh$) greater than 2 prismatic diopters in absolute value, said addition of horizontal prismatic power ($\Delta Prh$) being defined as the difference between the horizontal prismatic refractive power (Prh(L)) at the reference point (L) of the far vision zone and the horizontal prismatic refractive power (Prh(P')) at the projection point (P') of the reference point (P) of the near vision zone (VP) onto the vertical line passing through the reference point (L) of the far vision zone.

15. A method according to claim 13, applied to children with myopia.

16. A method according to claim 13, applied to a subject with myopia presenting exophoria in near vision, in which the addition of prism by the lens is nasally based.

17. A method according to claim 13, applied to a subject with myopia presenting esophoria in near vision, in which the addition of prism by the lens is temporally based.

* * * * *